United States Patent
Wu et al.

(10) Patent No.: US 12,504,802 B2
(45) Date of Patent: Dec. 23, 2025

(54) ELECTRONIC DEVICE AND CONTROL METHOD THEREOF

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/765,536

(22) Filed: Jul. 8, 2024

(65) Prior Publication Data
US 2025/0306656 A1 Oct. 2, 2025

(30) Foreign Application Priority Data
Mar. 29, 2024 (TW) .................................. 113111988

(51) Int. Cl.
*G06F 1/26* (2006.01)
*G06F 3/01* (2006.01)
*H03F 3/24* (2006.01)

(52) U.S. Cl.
CPC ................ *G06F 1/26* (2013.01); *G06F 3/011* (2013.01); *H03F 3/245* (2013.01); *H03F 2200/451* (2013.01)

(58) Field of Classification Search
CPC . G06F 1/26; G06F 3/011; H03F 3/245; H03F 2200/451
See application file for complete search history.

(56) References Cited

U.S. PATENT DOCUMENTS

| | | | |
|---|---|---|---|
| 10,756,772 B1* | 8/2020 | Patel | H03D 7/1466 |
| 11,258,408 B2* | 2/2022 | Henzler | H02M 3/158 |
| 12,089,953 B1* | 9/2024 | Guo | G06F 3/015 |
| 2007/0178856 A1* | 8/2007 | Mitzlaff | H03F 1/02 |
| | | | 455/127.1 |
| 2014/0306770 A1* | 10/2014 | Vetter | H03G 11/08 |
| | | | 330/297 |
| 2015/0194940 A1* | 7/2015 | Briffa | H03F 1/0227 |
| | | | 455/127.3 |
| 2016/0072457 A1* | 3/2016 | Subrahmaniyan Radhakrishnan | H03F 1/0227 |
| | | | 375/219 |
| 2017/0005676 A1* | 1/2017 | Yan | H03F 3/24 |
| 2017/0063475 A1* | 3/2017 | Feng | H04L 43/028 |
| 2017/0344102 A1* | 11/2017 | Kolla | H02M 1/08 |
| 2018/0368065 A1* | 12/2018 | Sarkas | H04W 52/0225 |
| 2019/0246963 A1* | 8/2019 | Chung | A61B 5/14532 |
| 2021/0194515 A1* | 6/2021 | Go | H04B 1/401 |

(Continued)

FOREIGN PATENT DOCUMENTS

CN 110098809 B 4/2023

*Primary Examiner* — Ibrahim A Khan
(74) *Attorney, Agent, or Firm* — Birch, Stewart, Kolasch & Birch, LLP

(57) ABSTRACT

An electronic device includes a power amplifier and a control circuit. The power amplifier is supplied by a supply voltage. The control circuit generates the supply voltage. The control circuit determines an upper limit voltage and a lower limit voltage according to activity information and content information. If the supply voltage is higher than the upper limit voltage, the control circuit will update and decrease the supply voltage. If the supply voltage is lower than the lower limit voltage, the control circuit will update and increase the supply voltage.

21 Claims, 6 Drawing Sheets

(56) References Cited

U.S. PATENT DOCUMENTS

| | | | | |
|---|---|---|---|---|
| 2021/0244318 A1* | 8/2021 | Sashen | ............... | A61B 5/1123 |
| 2021/0402898 A1* | 12/2021 | Alvarez | ............... | B60N 2/501 |
| 2022/0012922 A1* | 1/2022 | Ishikawa | ............. | G06V 40/193 |
| 2022/0198980 A1* | 6/2022 | Sun | ..................... | G09G 3/3611 |
| 2024/0039764 A1* | 2/2024 | Camuffo | ............. | H03F 1/3247 |

* cited by examiner

100

ELECTRONIC DEVICE AND CONTROL METHOD THEREOF

CROSS REFERENCE TO RELATED APPLICATIONS

This application claims priority of Taiwan Patent Application No. 113111988 filed on Mar. 29, 2024, the entirety of which is incorporated by reference herein.

BACKGROUND OF THE INVENTION

Field of the Invention

The invention relates to an electronic device, and more particularly, to an electronic device and a control method thereof.

Description of the Related Art

In the field of wireless communication, the supply voltage of a power amplifier must remain constant. If it is not constant, this may result in additional power consumption and it may degrade overall operational efficiency. Accordingly, there is a need to propose a novel solution for solving the problem of the prior art.

BRIEF SUMMARY OF THE INVENTION

In an exemplary embodiment, the invention is directed to an electronic device that includes a power amplifier and a control circuit. The power amplifier is supplied by a supply voltage. The control circuit generates the supply voltage. The control circuit determines an upper limit voltage and a lower limit voltage according to activity information and content information. If the supply voltage is higher than the upper limit voltage, the control circuit will update and decrease the supply voltage. If the supply voltage is lower than the lower limit voltage, the control circuit will update and increase the supply voltage.

In some embodiments, the electronic device further includes a sensor for monitoring a user, so as to obtain a responsive signal.

In some embodiments, the sensor is a 9-axis sensor disposed on the user.

In some embodiments, the control circuit performs a smoothing process on the responsive signal, so as to generate a smooth signal. The activity information includes the smooth signal.

In some embodiments, the electronic device further includes an HMD (Head Mounted Display) for analyzing image information, so as to generate the content information.

In some embodiments, the content information includes a first sample signal and a second sample signal.

In some embodiments, the HMD samples the image information based on a first time period, so as to generate the first sample signal. The HMD further samples the image information based on a second time period, so as to generate the second sample signal.

In some embodiments, the second time period is different from the first time period.

In some embodiments, the control circuit performs a weighted averaging process on the activity information and the content information, so as to calculate a central voltage.

In some embodiments, the control circuit determines the upper limit voltage by adding a differential voltage to the central voltage. The control circuit further determines the lower limit voltage by subtracting the differential voltage from the central voltage.

In some embodiments, the electronic device is applied to an HBC (Human Body Communication) transceiver module.

In some embodiments, an electrode element in the HBC transceiver module is an HBC electrode touching a human body part.

In some embodiments, the operational frequency of the HBC transceiver module is from 2 MHz to 102 MHz.

In another exemplary embodiment, the invention is directed to a control method that includes the steps of: providing a power amplifier and a control circuit, wherein the power amplifier is supplied by a supply voltage; generating the supply voltage by the control circuit; determining an upper limit voltage and a lower limit voltage by the control circuit according to activity information and content information; if the supply voltage is higher than the upper limit voltage, updating and decreasing the supply voltage by the control circuit; and if the supply voltage is lower than the lower limit voltage, updating and increasing the supply voltage by the control circuit.

In some embodiments, the control method further includes: monitoring a user by a sensor, so as to obtain a responsive signal.

In some embodiments, the control method further includes: performing a smoothing process on the responsive signal by the control circuit, so as to generate a smooth signal. The activity information includes the smooth signal.

In some embodiments, the control method further includes: analyzing image information by an HMD, so as to generate the content information.

In some embodiments, the control method further includes: sampling the image information by the HMD based on a first time period, so as to generate the first sample signal; and sampling the image information by the HMD based on a second time period, so as to generate the second sample signal.

In some embodiments, the control method further includes: performing a weighted averaging process on the activity information and the content information by the control circuit, so as to calculate a central voltage.

In some embodiments, the control method further includes: determining the upper limit voltage by the control circuit by adding a differential voltage to the central voltage; and determining the lower limit voltage by the control circuit by subtracting the differential voltage from the central voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 1:
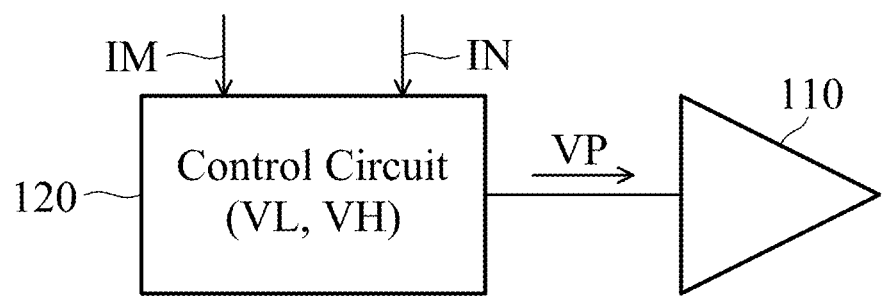
FIG. 1 is a diagram of an electronic device according to an embodiment of the invention.

In order to illustrate the foregoing and other purposes, features and advantages of the invention, the embodiments and figures of the invention will be described in detail as follows.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

The following disclosure provides many different embodiments, or examples, for implementing different features of the subject matter provided. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a diagram of an electronic device 100 according to an embodiment of the invention. The electronic device 100 may be applied in a related device of VR (Virtual Reality) or AR (Augmented Reality). Alternatively, the electronic device 100 may be applied to an HBC (Human Body Communication) transceiver module. For example, an electrode element in the HBC transceiver module may be an HBC electrode touching a human body part, and the operational frequency of the HBC transceiver module may be from 2 MHz to 102 MHz, but it is not limited thereto. In the embodiment of FIG. 1, the electronic device 100 at least includes a power amplifier 110 and a control circuit 120. It should be understood that the electronic device 100 may further include other components, such as a signal source, an antenna element, an RF (Radio Frequency) front-end circuit, a touch control panel, a battery, and/or a power supply module, although they are not displayed in FIG. 1.

The power amplifier 110 is supplied by a supply voltage VP. The control circuit 120 generates the supply voltage VP. The control circuit 120 determines an upper limit voltage VH and a lower limit voltage VL according to activity information IM and content information IN. For example, the activity information IM may be related to a response or a movement of a user, and the content information IN may be related to a picture or a video, but they are not limited thereto. Next, the control circuit 120 compares the supply voltage VP with the upper limit voltage VH and the lower limit voltage VL. For example, if the supply voltage VP is higher than the upper limit voltage VH, the control circuit 120 may update and decrease the supply voltage VP. Conversely, if the supply voltage VP is lower than the lower limit voltage VL, the control circuit 120 may update and increase the supply voltage VP.

With such a design of the invention, the control circuit 120 can appropriately adjust the supply voltage VP of the power amplifier 110, such that it can be substantially maintained between the upper limit voltage VH and the lower limit voltage VL. Therefore, the proposed electronic device 100 can almost provide ET (Envelope tracking) technology. According to practical measurements, the overall power consumption of the electronic device 100 of the invention can be significantly improved.

The following embodiments will introduce different configurations and detail structural features of the electronic device 100. It should be understood that these figures and descriptions are merely exemplary, rather than limitations of the invention.

Figure 2:
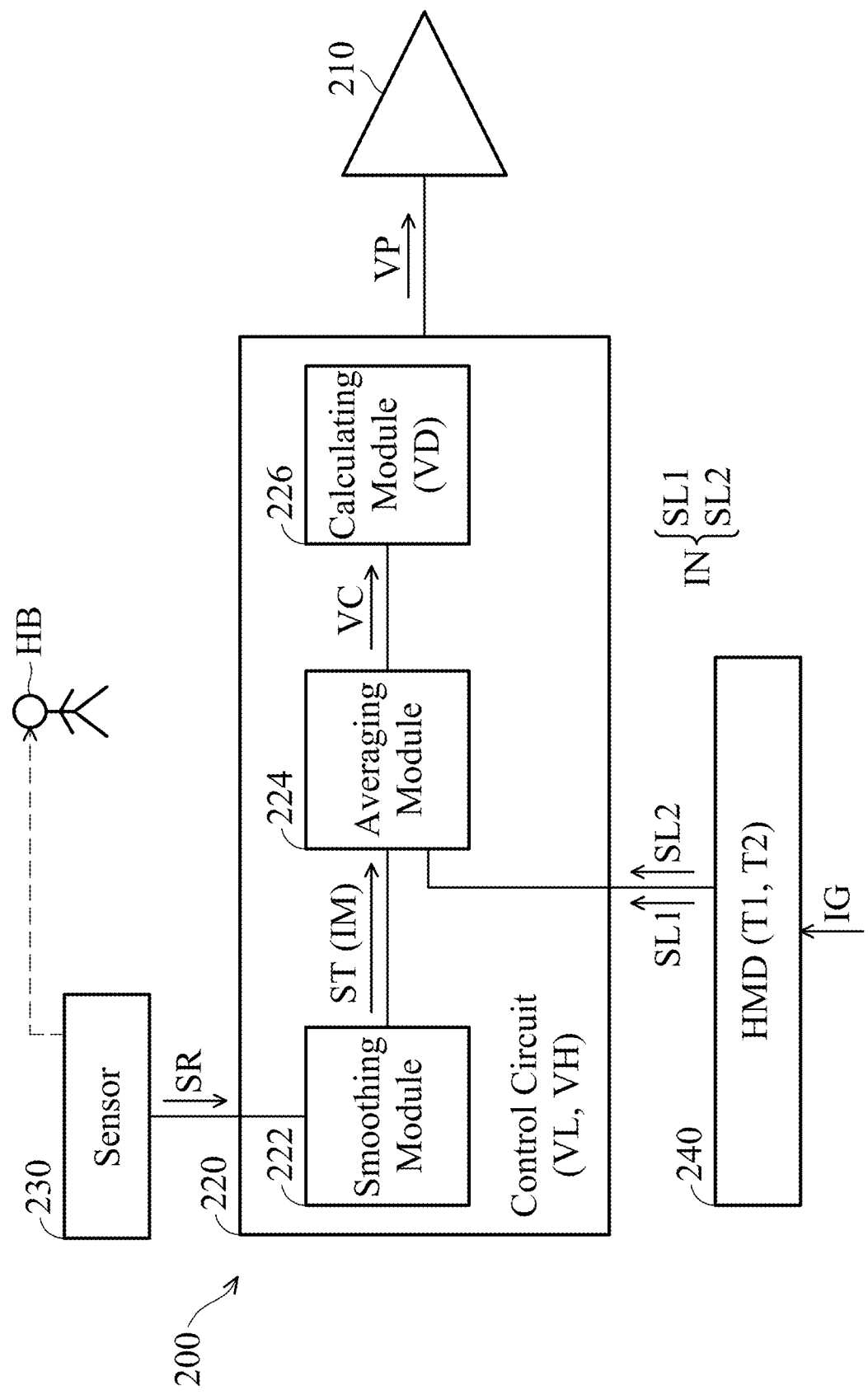
FIG. 2 is a diagram of an electronic device according to an embodiment of the invention.

FIG. 2 is a diagram of an electronic device 200 according to an embodiment of the invention. FIG. 2 is similar to FIG. 1. In the embodiment of FIG. 2, besides a power amplifier 210 and a control circuit 220, the electronic device 200 further includes a sensor 230 and an HMD (Head Mounted Display) 240. Similarly, the power amplifier 210 is supplied by a supply voltage VP. The control circuit 220 generates the supply voltage VP. In addition, the control circuit 220 determines an upper limit voltage VH and a lower limit voltage VL according to activity information IM and content information IN.

The sensor 230 monitors the state of a user HB, so as to obtain a responsive signal SR. For example, the responsive signal SR may include a displacement, a rotation, or a sense voltage waveform of any body movement relative to the user HB. In some embodiments, the sensor 230 is a 9-axis sensor disposed on the user HB. The sensor 230 may include a triaxial accelerometer, a triaxial gyroscope, and a triaxial magnetometer (not shown), but it is not limited thereto.

The control circuit 220 may be implemented with an MCU (Microcontroller Unit). In some embodiments, the control circuit 220 includes a smoothing module 222. The smoothing module 222 of the control circuit 220 performs a smoothing process on the responsive signal SR, so as to generate a smooth signal ST. The aforementioned activity information IM may include the smooth signal ST.

Figure 3A:
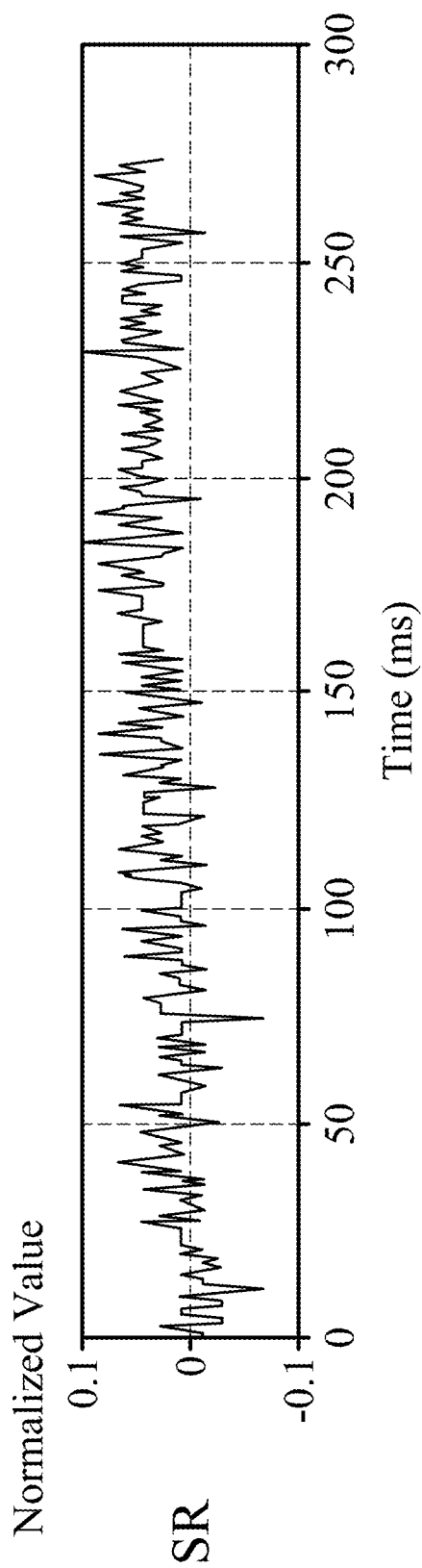
FIG. 3A is a diagram of a voltage waveform of a responsive signal according to an embodiment of the invention.

FIG. 3A is a diagram of a voltage waveform of the responsive signal SR according to an embodiment of the invention. The horizontal axis represents the time (ms), and the vertical axis represents the corresponding normalized value. As shown in FIG. 3A, the responsive signal SR belongs to an original data signal, which usually includes more high-frequency components.

Figure 3B:
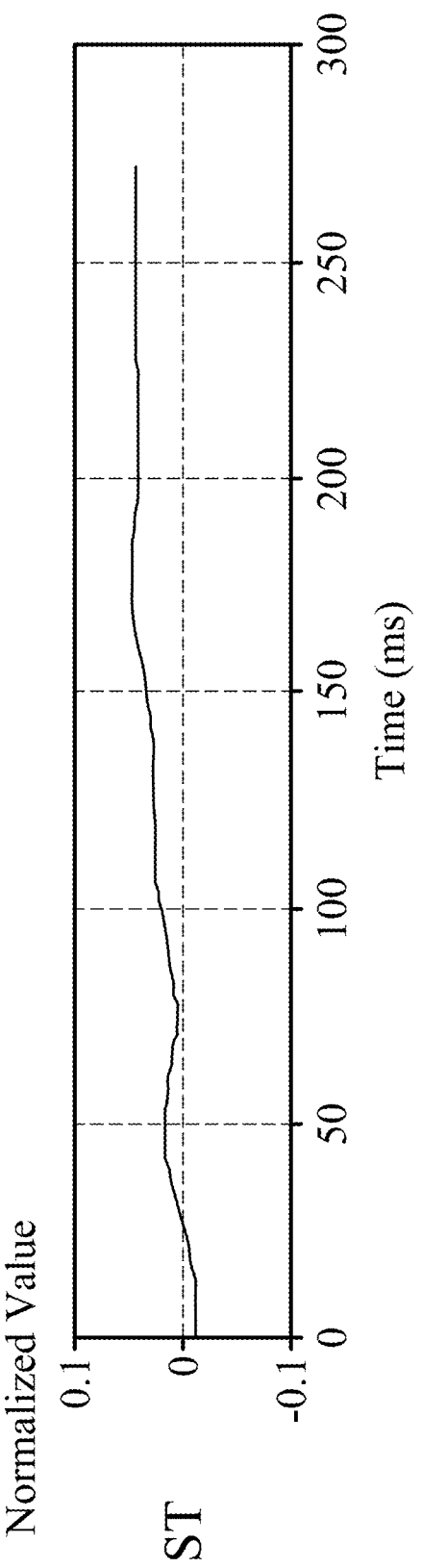
FIG. 3B is a diagram of a voltage waveform of a smooth signal according to an embodiment of the invention.

FIG. 3B is a diagram of a voltage waveform of the smooth signal ST according to an embodiment of the invention. The horizontal axis represents the time (ms), and the vertical axis represents the corresponding normalized value. As shown in FIG. 3B, the high-frequency components and other noise of the smooth signal ST are usually filtered out, and it helps to enhance the accuracy of the following signal analysis. In some embodiments, the smoothing module 222 of the control circuit 220 is implemented with a low-pass filter or a wavelet transformer. For example, the wavelet transformer may perform a 4th or 5th wavelet transforming process.

The HMD 240 may be worn by the user HB. The HMD 240 analyzes image information IG, so as to generate the content information IN. For example, the image information IG may include a voltage waveform with a single dimension, and the voltage waveform may be related to a 2D (Two-Dimensional) image that the user HB observes in the HMD 240. That is, the HMD 240 may convert the 2D image into the image information IG in advance. In some embodiments, the image information IG is arranged to predict the behavior of the user HB. For example, if the 2D image corresponds to an earthquake scene at a specific time point, the image information IG may provide a peak voltage at the specific time point, and it represents that the user HB may take dramatic action.

Figure 4:
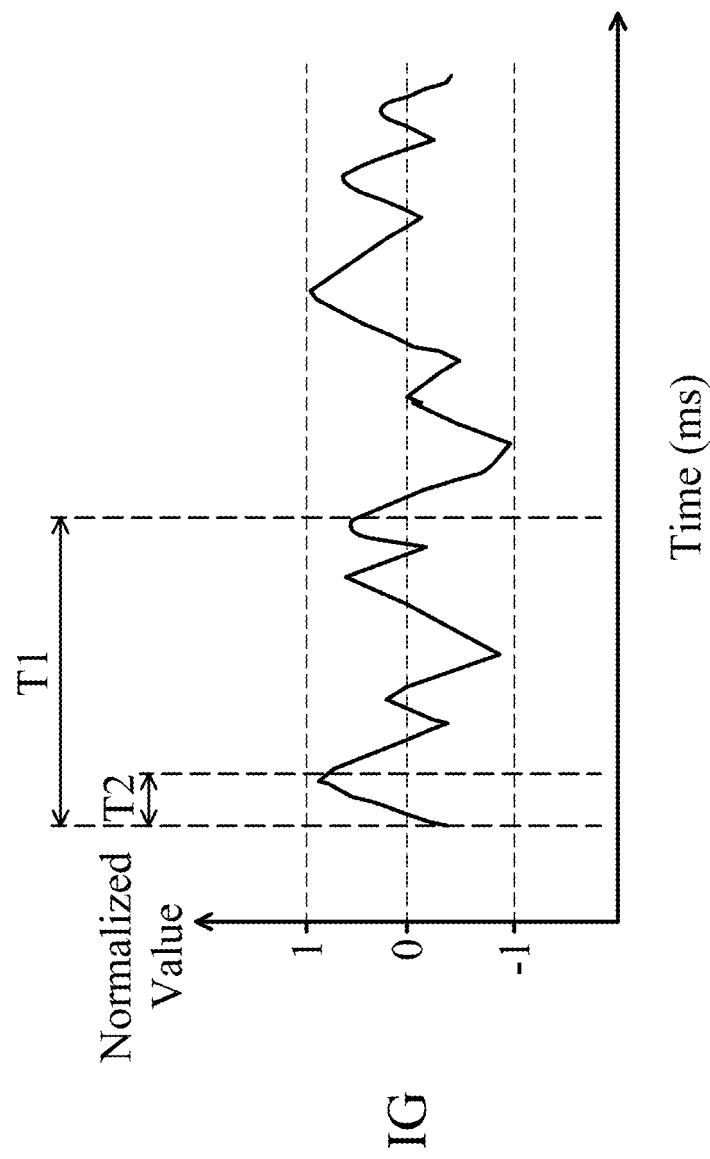
FIG. 4 is a diagram of a voltage waveform of image information according to an embodiment of the invention.

FIG. 4 is a diagram of a voltage waveform of the image information IG according to an embodiment of the invention. The horizontal axis represents the time (ms), and the vertical axis represents the corresponding normalized value. Please refer to FIG. 2 and FIG. 2 together. Specifically, the HMD 240 samples the image information IG based on a first time period T1, so as to generate a first sample signal SL1, and further samples the image information IG based on a second time period T2, so as to generate a second sample signal SL2. The aforementioned content information IN may include the first sample signal SL1 and the second sample signal SL2. It should be noted that the second time period T2 is different from the first time period T1. For example, the first time period T1 may be substantially equal to 20 ms, and the second time period T2 may be substantially equal to 5 ms, but they are not limited thereto. According to practical measurements, if a sampling process is performed on the image information IG using different time periods, the meaningless short-term fluctuations and the high-frequency noise can be effectively suppressed, thereby increasing the overall calculation efficiency. In some embodiments, the aforementioned sampling process is performed by using an NAM (Normalized Amplitude Maximum) function, but it is not limited thereto.

In some embodiments, the control circuit 220 further includes an averaging module 224 and a calculating module 226. It should be understood that each module of the control circuit 220 may be implemented with a hardware circuit, a soft program, or a combination thereof. Generally, the averaging module 224 of the control circuit 220 performs a weighted averaging process on the activity information IM and the content information IN, so as to calculate a central voltage VC. Next, the calculating module 226 of the control circuit 220 determines the upper limit voltage VH by adding a differential voltage VD to the central voltage VC, and further determines the lower limit voltage VL by subtracting the differential voltage VD from the central voltage VC.

In some embodiments, the control circuit 220 is operated according to the following equations (1) to (4):

$$VC = \frac{(W1) \cdot (SL1) + (W2) \cdot (SL2) + ST}{3} \quad (1)$$

$$VH = VC + VD \quad (2)$$

$$VL = VC - VD \quad (3)$$

$$VD = K \cdot \sigma \quad (4)$$

where "VC" represents the level of the central voltage VC, "VH" represents the level of the upper limit voltage VH, "VL" represent the level of the lower limit voltage VL, "VD" represents the level of the differential voltage VD, "W1" represents a first weight parameter, "W2" represents a second weight parameter, "SL1" represents the level of the first sample signal SL1, "SL2" represents the level of the second sample signal SL2, "ST" represents the level of the smooth signal ST, "K" represents a specific ratio, and "σ" represents a standard deviation of the central voltage VC.

In some embodiments, the first weight parameter W1 is from 0 to 1, the second weight parameter W2 is from 0 to 1, and the specific ratio K is from 1 to 2. The above ranges of parameters are calculated and obtained according to many experimental results, and they help to optimize the overall power consumption of the electronic device 200.

Figure 5:
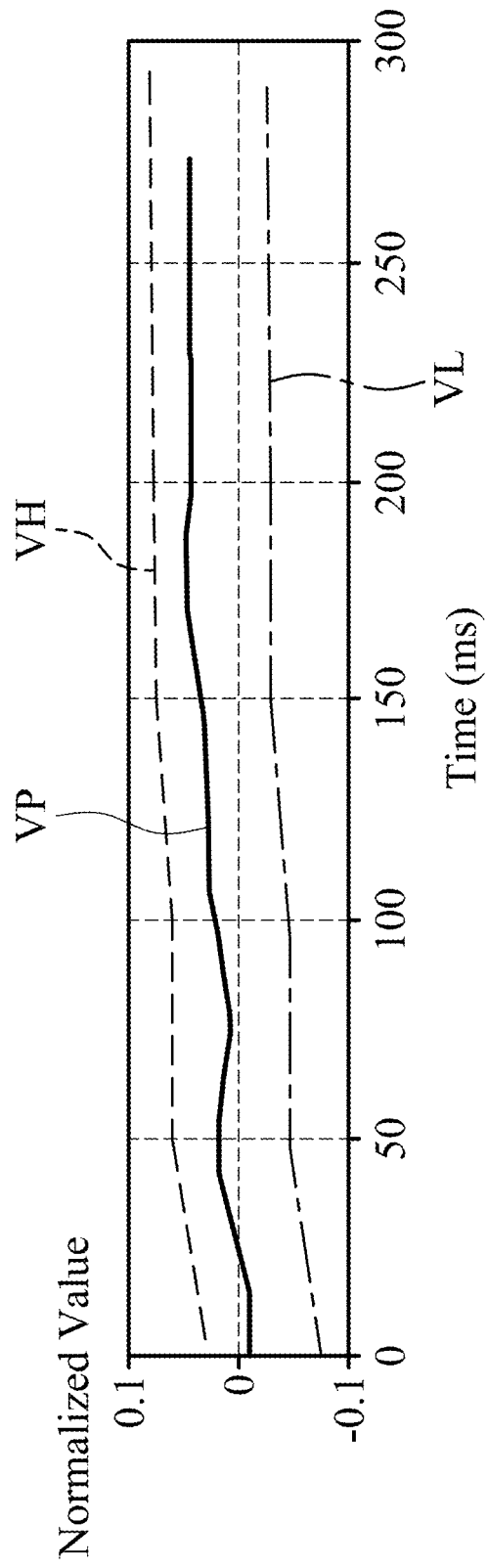
FIG. 5 is a diagram of voltage waveforms of a supply voltage, an upper limit voltage, and a lower limit voltage according to an embodiment of the invention.

FIG. 5 is a diagram of voltage waveforms of the supply voltage VP, the upper limit voltage VH, and the lower limit voltage VL according to an embodiment of the invention. The horizontal axis represents the time (ms), and the vertical axis represents the corresponding normalized values. According to the measurement of FIG. 5, the electronic device 200 can appropriately adjust the supply voltage VP, and it can be substantially maintained between the upper limit voltage VH and the lower limit voltage VL, so as to almost provide the ET technology and function.

Figure 6:
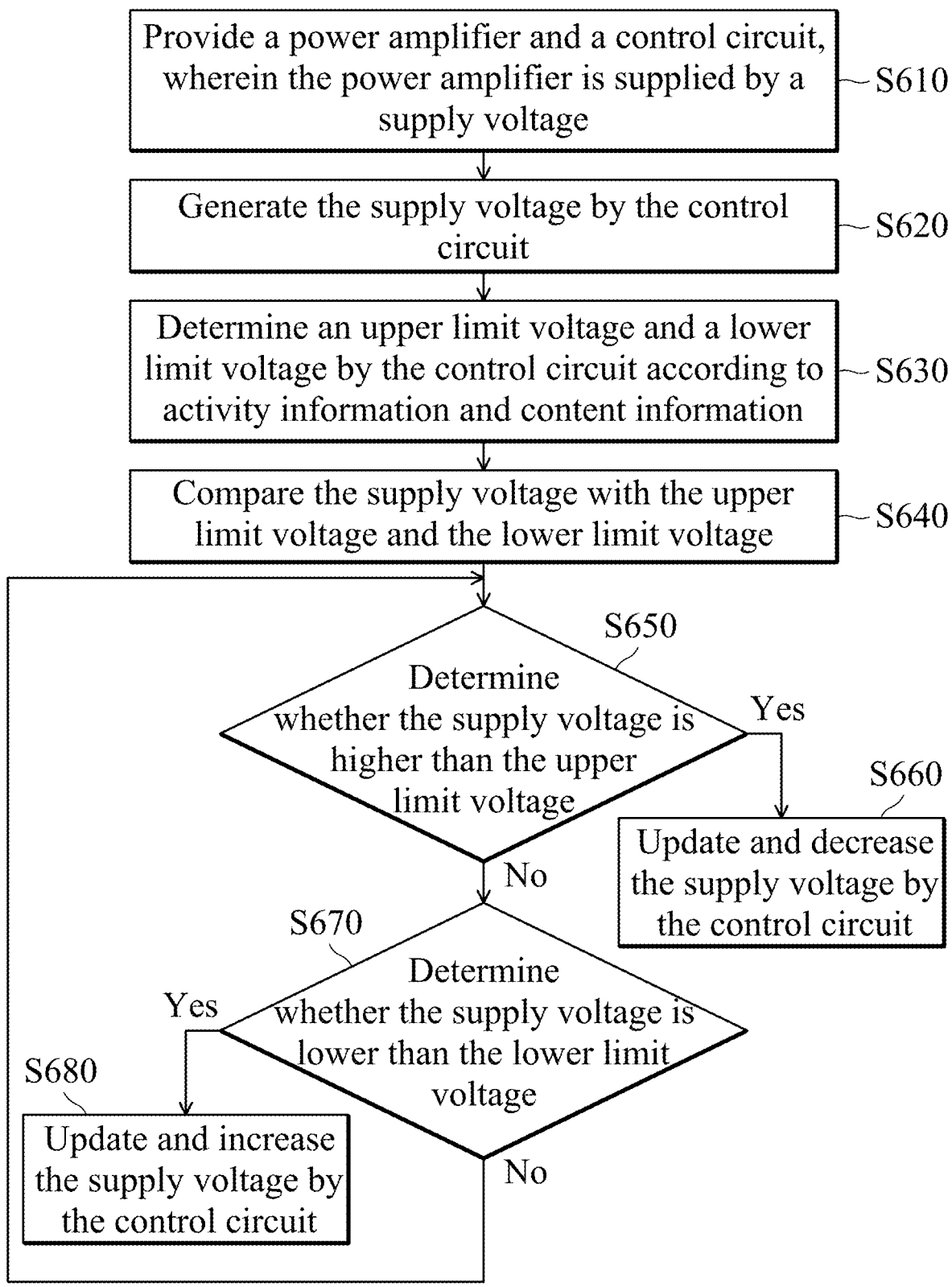
FIG. 6 is a flowchart of a control method according to an embodiment of the invention.

FIG. 6 is a flowchart of a control method according to an embodiment of the invention. To begin, in step S610, a power amplifier and a control circuit are provided. The power amplifier is supplied by a supply voltage. In step S620, the supply voltage is generated by the control circuit. In step S630, an upper limit voltage and a lower limit voltage are determined by the control circuit according to activity information and content information. In step S640, the supply voltage is compared with the upper limit voltage and the lower limit voltage. In step S650, whether the supply voltage is higher than the upper limit voltage is determined. If so, in step S660, the supply voltage will be updated and decreased by the control circuit. If not, in step S670, whether the supply voltage is lower than the lower limit voltage is determined. If so, in step S680, the supply voltage will be updated and increased by the control circuit. If not, the procedure of the control method will go back to the step S650 again. It should be understood that these steps are not required to be performed in order, and every feature of the embodiments of FIGS. 1-5 may be applied to the control method of FIG. 6.

The invention proposes a novel electronic device and a novel control method. In comparison to the conventional design, the invention has at least the advantages of increasing the operational efficiency and improving the overall power consumption. Therefore, the invention is suitable for application in a variety of devices.

Note that the above element parameters are not limitations of the invention. A designer can fine-tune these setting values according to different requirements. It should be understood that the electronic device and the control method of the invention are not limited to the configurations of FIGS. 1-6. The invention may include any one or more features of any one or more embodiments of FIGS. 1-6. In other words, not all of the features displayed in the figures should be implemented in the electronic device and the control method of the invention.

The method of the invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. An electronic device, comprising:
    a power amplifier, supplied by a supply voltage; and
    a control circuit, generating the supply voltage, wherein the control circuit determines an upper limit voltage and a lower limit voltage according to activity information and content information;
    wherein if the supply voltage is higher than the upper limit voltage, the control circuit updates and decreases the supply voltage;
    wherein if the supply voltage is lower than the lower limit voltage, the control circuit updates and increases the supply voltage;
    wherein the control circuit performs a weighted averaging process on the activity information and the content information;
    wherein the weighted averaging process is performed so as to calculate a central voltage;
    wherein the control circuit determines the upper limit voltage by adding a differential voltage to the central voltage, and further determines the lower limit voltage by subtracting the differential voltage from the central voltage.

2. The electronic device as claimed in claim 1, further comprising:
    a sensor, monitoring a user, so as to obtain a responsive signal.

3. The electronic device as claimed in claim 2, wherein the sensor is a 9-axis sensor disposed on the user.

4. The electronic device as claimed in claim 2, wherein the control circuit performs a smoothing process on the responsive signal, so as to generate a smooth signal, and the activity information comprises the smooth signal.

5. The electronic device as claimed in claim 1, further comprising:
    an HMD (Head Mounted Display), analyzing image information, so as to generate the content information.

6. The electronic device as claimed in claim 5, wherein the content information comprises a first sample signal and a second sample signal.

7. The electronic device as claimed in claim 6, wherein the HMD samples the image information based on a first time period, so as to generate the first sample signal, and further samples the image information based on a second time period, so as to generate the second sample signal.

8. The electronic device as claimed in claim 7, wherein the second time period is different from the first time period.

9. The electronic device as claimed in claim 1, wherein the electronic device is applied to an HBC (Human Body Communication) transceiver module.

10. The electronic device as claimed in claim 9, wherein an electrode element in the HBC transceiver module is an HBC electrode touching a human body part.

11. The electronic device as claimed in claim 9, wherein an operational frequency of the HBC transceiver module is from 2 MHz to 102 MHz.

12. The electronic device as claimed in claim 1, wherein the central voltage is calculated according to a first weight parameter and a second weight parameter.

13. A control method, comprising the steps of:
    providing a power amplifier and a control circuit, wherein the power amplifier is supplied by a supply voltage;
    generating the supply voltage by the control circuit;
    determining an upper limit voltage and a lower limit voltage by the control circuit according to activity information and content information;
    if the supply voltage is higher than the upper limit voltage, updating and decreasing the supply voltage by the control circuit;
    if the supply voltage is lower than the lower limit voltage, updating and increasing the supply voltage by the control circuit;
    performing a weighted averaging process on the activity information and the content information by the control circuit;
    wherein the weighted averaging process is performed so as to calculate a central voltage;
    determining the upper limit voltage by the control circuit by adding a differential voltage to the central voltage; and
    determining the lower limit voltage by the control circuit by subtracting the differential voltage from the central voltage.

14. The control method as claimed in claim 13, further comprising:
    monitoring a user by a sensor, so as to obtain a responsive signal.

15. The control method as claimed in claim 14, wherein the sensor is a 9-axis sensor disposed on the user.

16. The control method as claimed in claim 14, further comprising:

performing a smoothing process on the responsive signal by the control circuit, so as to generate a smooth signal, wherein the activity information comprises the smooth signal.

17. The control method as claimed in claim 13, further comprising:
analyzing image information by an HMD, so as to generate the content information.

18. The control method as claimed in claim 17, wherein the content information comprises a first sample signal and a second sample signal.

19. The control method as claimed in claim 18, further comprising:
sampling the image information by the HMD based on a first time period, so as to generate the first sample signal; and
sampling the image information by the HMD based on a second time period, so as to generate the second sample signal.

20. The control method as claimed in claim 19, wherein the second time period is different from the first time period.

21. The control method as claimed in claim 13, wherein the central voltage is calculated according to a first weight parameter and a second weight parameter.

* * * * *